(12) United States Patent
Roubal et al.

(10) Patent No.: US 9,760,921 B2
(45) Date of Patent: Sep. 12, 2017

(54) HALF-GRAPHICAL USER INTERFACE ORDER PROCESSING SYSTEM AND METHOD

(75) Inventors: Eric Gunter Roubal, Eden Prairie, MN (US); Amit Bartake, Eden Prairie, MN (US)

(73) Assignee: Digital River, Inc., Minnetonka, MN (US)

( * ) Notice: Subject to any disclaimer, the term of this patent is extended or adjusted under 35 U.S.C. 154(b) by 961 days.

(21) Appl. No.: 12/195,990

(22) Filed: Aug. 21, 2008

(65) Prior Publication Data

US 2010/0049656 A1  Feb. 25, 2010

(51) Int. Cl.
*G06Q 30/06* (2012.01)

(52) U.S. Cl.
CPC ..... *G06Q 30/0603* (2013.01); *G06Q 30/0601* (2013.01)

(58) Field of Classification Search
CPC .......................... G06Q 30/0601; G06Q 20/02
USPC ...................................... 705/50–79
See application file for complete search history.

(56) References Cited

U.S. PATENT DOCUMENTS

| | | | | |
|---|---|---|---|---|
| 4,633,394 A | * | 12/1986 | Georgiou et al. | 710/240 |
| 5,757,917 A | * | 5/1998 | Rose et al. | 705/79 |
| 5,892,900 A | | 4/1999 | Ginter et al. | |
| 6,374,402 B1 | | 4/2002 | Schmeidler et al. | |
| 6,490,567 B1 | * | 12/2002 | Gregory | 705/39 |
| 6,629,135 B1 | * | 9/2003 | Ross et al. | 709/218 |
| 6,836,765 B1 | * | 12/2004 | Sussman | 705/75 |
| 7,072,859 B1 | | 7/2006 | Huber | |
| 7,137,006 B1 | | 11/2006 | Grandcolas et al. | |
| 7,197,475 B1 | * | 3/2007 | Lorenzen et al. | 705/26.81 |
| 7,225,148 B2 | | 5/2007 | Kassan | |
| 7,257,581 B1 | * | 8/2007 | Steele et al. | 709/203 |
| 7,308,424 B2 | | 12/2007 | Urabe | |
| 7,346,587 B2 | | 3/2008 | Goldstein et al. | |
| 7,363,247 B1 | | 4/2008 | Barnhill, Jr. et al. | |
| 7,373,321 B2 | | 5/2008 | Collings et al. | |

(Continued)

FOREIGN PATENT DOCUMENTS

WO    0114990 A1    3/2001

OTHER PUBLICATIONS

Intelligent Application Gateway 2007, Whale Communications, Feb. 2007.*

(Continued)

*Primary Examiner* — Steven S Kim
(74) *Attorney, Agent, or Firm* — Lynn Holly; Billion & Armitage; Shawn Dempster

(57) ABSTRACT

A half-graphical user interface (Half-GUI) order processing (HGOP) system with single sign on and its method of use is described. A set of web services may be utilized for order processing in an electronic commerce system which allows a merchant to host a product catalog and shopping cart, but post the transaction to an e-commerce system in one simple transaction. In response to a shopping cart request and utilizing single sign on technology, the HGOP system exposes a single checkout form, prepopulated with customer account information to a merchant web site. If no edits are required, the transaction posts and an order confirmation/thank you page is displayed. If edits are required or a new customer account is required, the customer's account is updated or created.

6 Claims, 5 Drawing Sheets

(56) References Cited

U.S. PATENT DOCUMENTS

| | | | |
|---|---|---|---|
| 7,640,193 B2* | 12/2009 | Crespo | G06Q 30/06 705/26.2 |
| 7,716,077 B1* | 5/2010 | Mikurak | 705/8 |
| 7,865,399 B2* | 1/2011 | Crespo | G06Q 20/02 705/21 |
| 8,190,493 B2* | 5/2012 | Saarinen | G06O 30/0601 705/26.1 |
| 9,324,098 B1* | 4/2016 | Agrawal | G06Q 30/04 |
| 2001/0049672 A1* | 12/2001 | Moore et al. | 707/1 |
| 2002/0059114 A1* | 5/2002 | Cockrill et al. | 705/27 |
| 2003/0023512 A1 | 1/2003 | Festa et al. | |
| 2003/0088483 A1 | 5/2003 | Moyer | |
| 2003/0115107 A1 | 6/2003 | Amensen et al. | |
| 2003/0126075 A1* | 7/2003 | Mascavage et al. | 705/39 |
| 2003/0191709 A1* | 10/2003 | Elston et al. | 705/40 |
| 2004/0047287 A1 | 3/2004 | Tremblay et al. | |
| 2004/0068693 A1* | 4/2004 | Rawat et al. | 715/507 |
| 2005/0027610 A1* | 2/2005 | Wharton | 705/26 |
| 2005/0065881 A1* | 3/2005 | Li | G06Q 30/0641 705/40 |
| 2005/0108104 A1 | 5/2005 | Woo | |
| 2005/0171836 A1* | 8/2005 | Leacy | 705/14 |
| 2005/0177437 A1 | 8/2005 | Ferrier | |
| 2005/0273396 A1 | 12/2005 | Aliabadi et al. | |
| 2006/0021019 A1 | 1/2006 | Hinton et al. | |
| 2006/0031147 A1* | 2/2006 | Bell et al. | 705/27 |
| 2006/0085281 A1 | 4/2006 | Hanai et al. | |
| 2006/0085282 A1 | 4/2006 | Hanai et al. | |
| 2007/0043626 A1 | 2/2007 | Duvall et al. | |
| 2007/0233573 A1* | 10/2007 | Wang et al. | 705/26 |
| 2007/0260529 A1 | 11/2007 | Furuno | |
| 2007/0268163 A1 | 11/2007 | Aydar et al. | |
| 2007/0294184 A1* | 12/2007 | Lee | G06Q 20/0855 705/67 |
| 2007/0299732 A1 | 12/2007 | Gluzberg et al. | |
| 2007/0299739 A1 | 12/2007 | Urabe | |
| 2008/0005021 A1 | 1/2008 | Brown et al. | |
| 2008/0228853 A1* | 9/2008 | Brinck et al. | 709/201 |
| 2009/0271250 A1* | 10/2009 | Sriver et al. | 705/10 |

OTHER PUBLICATIONS

Creative Cart Internet Shopping Cart Service, advertisement on www.creativecart.com, last accessed Aug. 19, 2008.

* cited by examiner

HALF-GRAPHICAL USER INTERFACE ORDER PROCESSING SYSTEM AND METHOD

FIELD OF THE INVENTION

The present invention relates to commerce systems for use on the Internet. More particularly, the present invention relates to a system and method for utilizing Web services in order processing in an electronic commerce system.

BACKGROUND OF THE INVENTION

Through the use of common software structures, a network of computers known as the World Wide Web (Web), or Internet, enables vast and immediate interconnectedness for many users. Web technologies (such as hypertext markup language (HTML), hypertext transfer protocol (HTTP), Web servers and browsers) and a combination of software applications known as "Web services" allow customers to connect with businesses and businesses to connect with each other to conduct transactions over the Internet. In most cases, these technologies are standardized to provide an interoperable means for internet content providers and merchants to expose their products and services to end users.

A browser application installed on a client computer allows the user access to internet resources. This access, and movement around the Internet, is enhanced by the use of hyperlinks ("links") within a Web page's HTML content, which defines the document. The link, typically a word in a text field or an image on a Web page, acts as a path that moves the user from one Web page universal resource locator (URL) address to another using HTTP by means of the Transmission Control Protocol (TCP) and the Internet Protocol (IP) collectively known as the TCP/IP suite of protocols. The movement from one URL to another allows near-instant access to information, products, and services and is particularly well-suited to the exchange of information, goods, and services between buyers and sellers. Such business is commonly referred to as "electronic commerce," or "e-commerce."

With the abundance of goods and services available on the Internet, a Web merchant seeks a method for competitively processing orders for its goods and services in a way that makes sense for its size, product line, available resources, and goals and objectives. For some merchants, self-hosting of the e-commerce functions and processes makes sense. These merchants may only require the basic catalog display, shopping cart and transaction processing functions. For others, however, more extensive features are required, or the merchant may desire integration of these basic features with its own inventory control, order processing and accounting systems and/or with other services and features. These highly integrated systems require flexibility and interoperability in order to interface applications with one another across organizations. The use of Web services allows communications between these programs, where neither system need know anything about the software with which it communicates.

A web service is a standardized way of integrating Web-based applications using the Extensible Markup Language (XML), Simple Object Access Protocol (SOAP), Web Services Description Language (WSDL), and other open standards over an internet protocol backbone. XML is used to tag the data, SOAP is used to transfer the data. WSDL is used for describing the services available. These services provide the interoperability required to integrate a merchant's applications with another merchant or one or more service providers.

Unlike Web technologies, Web services are not meant to be displayed in a web browser or otherwise exposed to an end user. Instead, they allow communication between systems. XML is a framework for creating tags which convey the meaning of the information included within them. The meanings, or semantics, of the tagged data are described by an XML schema. The XML document is created in the sending system, and parsed and translated in the receiving system using that shared definitions provided by the schema.

WSDL is a standard published by the World Wide Web Consortium (W3C) which allows a service provider to describe Web services in an XML format as a set of endpoints operating on messages. It is used to describe and locate Web services. The WSDL allows endpoints and messages to be described regardless of the message formats or network protocols.

SOAP is used to send information over the internet. A SOAP message contains a way to bind the standard Web messaging protocol, HTTP, an envelope that specifies the start and end of the message, the message itself, and a header containing additional information related to the message being sent. An alternative to using SOAP is to use a Web Services Invocation Framework (WSIF), for which SOAP is one possible binding method. A WSIF is an open application programming interface (API) for invoking Web services regardless of how the Web services are provided. The API is a simple Java program. Rather than use a common message format, such as SOAP, the WSIF API allows application developers to interact directly with abstract representations of Web services through their WSDL descriptions.

Without privacy and security assurances, many customers would not purchase online. In addition to Web services, many Web applications use the popular, easy to use and effective Pretty Good Privacy (PGP) encryption standard to ensure communication channel security. PGP uses public key cryptography to encrypt the contents of a shopping cart and to provide authentication. It provides a higher level of security than user names and passwords, which are also required to create or log customers into an online store account.

Taking advantage of the interoperability and flexibility provided by Web services allows a web merchant to distribute its business logic and strategy among several systems, applications and providers in order to meet its own e-commerce objectives.

BRIEF SUMMARY OF THE INVENTION

In accordance with one embodiment of the invention, a half-graphical, or partial, user interface (half-GUI) order processing (HGOP) system and its method of use is described. The HGOP web service and system provides flexibility as to which components of the e-commerce system the merchant hosts, and which is supplied by the e-commerce provider. In the preferred embodiment of the present invention as outlined in more detail below, the HGOP system uses Web technologies and Web services to allow an internet merchant to host its own product catalog and partial shopping cart and other components of an online store as desired, but post the information from the shopping cart to the commerce system cart at checkout time using a single transaction, over a pre-existing communication network. Single sign on (SSO) may be used to provide broad, but low-level authentication, to maintain synchronization between the e-commerce system and the merchant system, to preload existing customer information and to maintain a seamless user experience. The e-commerce system provides a PGP key and a posting URL to the merchant at the outset of the merchant/e-commerce system relationship. PGP armors the shopping cart and customer information for added security. The posting URL directs the checkout process in a way that provides a natural load balancing effect and offers additional features that may be had by using local e-commerce servers.

Additional advantages and features of an embodiment of the invention will be set forth in part in the description which follows, and in part, will become apparent to those skilled in the art upon examination of the following or may be learned by practice of the invention.

DETAILED DESCRIPTION

A preferred embodiment of the present invention referred to as an HGOP web service is described in detail below. It will be appreciated by those skilled in the art that variations the following is an example embodiment and that other embodiments may be implemented which do not depart from the scope and spirit of the present invention. In one embodiment, an HGOP service allows a merchant web site to host its own product catalog and shopping cart, but post the information from the shopping cart to the commerce system cart in one XML-formatted WSDL transaction at checkout time. The use of SSO technology allows the system to match the customer's information transmitted in the transaction with the information in its accounts, preload the existing customer information, maintain synchronization between the merchant store and accounts and the e-commerce system customer accounts. It also facilitates transparency to the customer when s/he is redirected to the commerce system upon posting the shopping cart contents and avoids the annoying need to sign in to more than one system and create more than one account.

Figure 1:
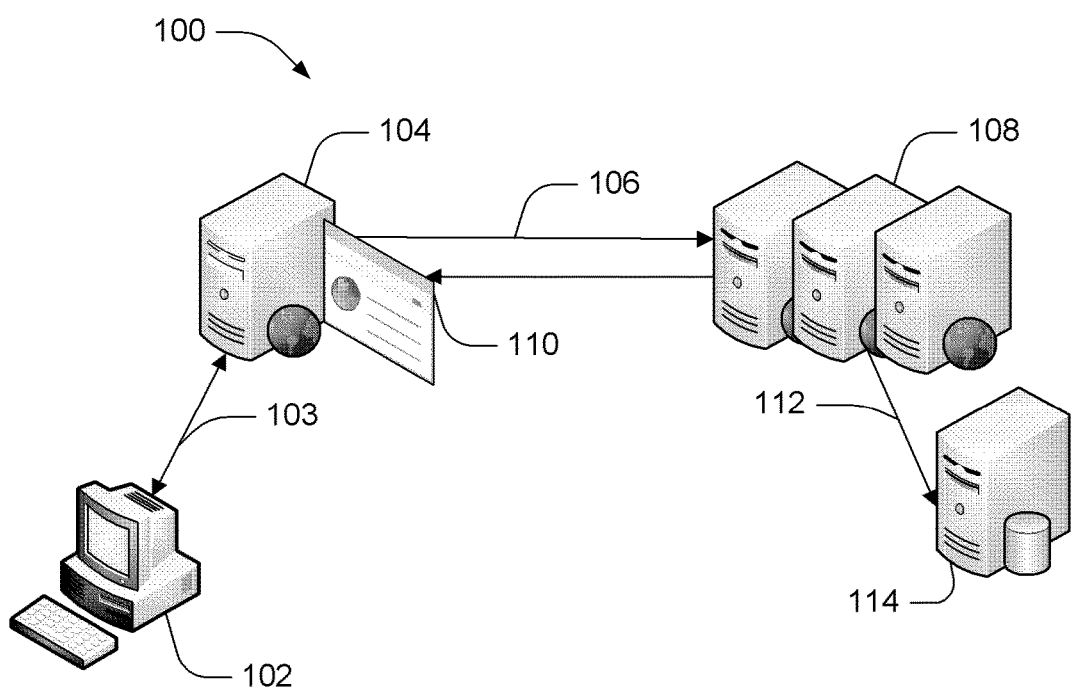
FIG. 1 illustrates the context of use for an HGOP system.

One embodiment of an HGOP system 100 is illustrated in FIG. 1. A customer operating a client computing device 102 accesses a merchant's web site and system 104 via a pre-existing communication network (e.g., the internet, a cellular data network, or any other data network). In an exemplary embodiment, the merchant may host the product catalog and virtual shopping cart on its site 104. When a customer clicks on a purchase button or otherwise indicates that s/he is committing to a purchase, the merchant system generates and transmits an XML request 106 to an e-commerce system hosted on at least one web server 108. The XML request may be similar to the CreateCartRequest described in Table 1, below, which conforms to the schema described in Table 2. In creating this request, the merchant system might use a PGP key and posting end point provided to the merchant by the e-commerce system 108. Use of the PGP key ensures that the contents of the cart and the customer's personal information are encrypted and passed securely to the e-commerce system server. The posting end point allows a distributed e-commerce system to direct the traffic to a particular server.

Providing the merchant with the posting endpoint URL serves several purposes. It directs the transaction to the commerce system; however, if the commerce system operates multiple servers in world wide locations, the direct can be made to the server most appropriate to the customer's region. In one embodiment, the URL end point allows the e-commerce system to redirect the customer to a local server. For example, if the customer is located in Europe the end point could direct the customer to the nearest e-commerce server, located in, for example, Ireland rather than Canada. This provides an efficient and highly performant load balancing effect. It also allows a great deal of flexibility in supporting world-wide payment options.

The e-commerce system may respond to the XML request with a simple HTML form 110, populated with the customer information as provided in the XML request, or pulled from the customer's e-commerce account. Additionally, the form may contain a single hidden HTML parameter, called "message," and assign the results obtained above as its value. When the user submits the form with an HTTP request to the URL, it is posted to its assigned end point.

In an embodiment of this invention the e-commerce system 108 provides authentication and the full spectrum of back-end order processing, including checkout, account management and fulfillment and distribution. Data may be stored on both sides of the transaction—in both the merchant system 104 and the e-commerce system 108, 114. Sales records may be created in the e-commerce system database 112, 114 and could be accessible to the customer from the merchant's web site 104 using SSO technology, allowing the customer to search his/her order history from the merchant site.

SSO is used to make the entire process transparent to the user and to keep the accounts on both systems in sync. The merchant system 104 passes the user login information to the commerce system 108 in the XML request 106, or WSDL file. If the customer is a known customer, the system logs in the user, processes the order within the indicated account and prepopulates the HGOP form 110 with the customer information. If the customer is new, the system creates a new account and processes the order within the new account. In this way, the commerce system is able to maintain a complete order history for the customer. In addition, account and order management functions may be performed at the application service provider (ASP) level.

CreateCartRequest

In the preferred embodiment, web services are provided for managing order processing in a commerce system through the use of an invoker application programming interface (API) or WSIF. A web service user may specify a number of input parameters for the invoke method of the API to invoke a specific commerce server operation. The input parameters in the illustrative examples that follow include a WSDL definition file location, the name of operation to be invoked, necessary parameters for the operation, a user name, and a password for accessing the commerce server 108 resource. The invoker API utilizes the WSIF to invoke commerce server operations dynamically as specified in the WSDL file.

The WSDL file of an embodiment of an HGOP contains just one function—the OrderService.CreateCart( ). This function sends order details to the commerce system by accepting the order contents (e.g., language, site, line items, product information, prices etc.) and returning the order ID and a redirect URL for the customer to complete the order.

A createCartRequest message of this type would be used to create a shopping cart in the commerce system and allow:
  Products to be added to the cart;
  Cart language and product language to be set;
  Authentication of the user;
  Additional information to be attached to the order or line items; and
  Customers to complete the order in their browser.

In one embodiment, where the merchant 104 hosts the entire product catalog and pricing functions, client-driven pricing can be implemented by passing a LineItemPriceInfo structure for each line item. Since this information may not be verified on the e-commerce 108 side, independent measures should be established to ensure that prices cannot be spoofed by unauthorized parties.

The following provide examples of XML and XSD for some of the functions of the system. It will be appreciated by those skilled in the art that other XML code could be devised that performs the same functions without departing from the scope and spirit of the present invention.

Within the XML sample software code, certain XML Schema Definitions (XSD) are identified. Tables 1 and 2 provide sample XSD software code that may be utilized with the WSDL and XML in accordance with one embodiment of the present invention and its associated schema definitions. Generally, XSD software code specifies how to formally describe the elements in an XML document. This description can be used to verify that each item of content in a document adheres to the description of the element in which the content is to be placed.

TABLE 1

CreateCartRequest
Sample Code

```
<?xml version="1.0" ?>
<createCartRequest
xmlns="http://integration.digitalriver.com/HGOP2-1">
  <externalReferenceID>order1234</externalReferenceID>
  <siteID>mysite</siteID>
  <locale>en_us</locale>
  <programID>112200</programID>
  <user>
    <externalReferenceID>user1234</externalReferenceID>
    <loginID>testuser@digitalriver.com</loginID>
    <password>abc1234</password>
    <authenticate>true</authenticate>
  </user>
  <billToAddress>
    <companyName>Digital River, Inc</companyName>
    <name1>John</name1>
    <name2>Doe</name2>
    <line1>9625 West 76th Street</line1>
    <line2>Suite 300</line2>
    <line3 />
    <city>Eden Prairie</city>
    <state>MN</state>
    <postalCode>55344</postalCode>
    <countryCode>US</countryCode>
    <email>jdoe@digitalriver.com</email>
    <phone1>952-253-1234</phone1>
```

TABLE 1-continued

CreateCartRequest
Sample Code

```
    <phone2 />
    <fax />
  </billToAddress>
  <shipToAddress>
    <companyName>Digital River, Inc</companyName>
    <name1>John</name1>
    <name2>Doe</name2>
    <line1>9625 West 76th Street</line1>
    <line2>Suite 300</line2>
    <line3 />
    <city>Eden Prairie</city>
    <state>MN</state>
    <postalCode>55344</postalCode>
    <countryCode>US</countryCode>
    <email>jdoe@digitalriver.com</email>
    <phone1>952-253-1234</phone1>
    <phone2 />
    <fax />
  </shipToAddress>
  <lineItems>
    <lineItem>
      <quantity>1</quantity>
      <product>
        <externalReferenceID>sku1234</externalReferenceID>
        <productID>123456789</productID>
        <companyID>mycompany</companyID>
      </product>
      <priceOverrideInfo>
        <price>
          <type>unit</type>
          <currencyCode>USD</currencyCode>
          <amount>19.95</amount>
        </price>
      </priceOverrideInfo>
      <lineItemExtendedAttributes>
        <lineItemExtendedAttribute>
          <name>color</name>
          <value>red</value>
        </lineItemExtendedAttribute>
      </lineItemExtendedAttributes>
    </lineItem>
  </lineItems>
  <offers>
    <offer>
      <offerID>1222333</offerID>
    </offer>
  </offers>
  <payment>
    <customer>
      <first>John</first>
      <middle>Henry</middle>
      <last>Doe</last>
    </customer>
    <creditcard>
      <type>visa</type>
      <number>24234234124312</number>
      <expirationMonth>11</expirationMonth>
      <expirationYear>2007</expirationYear>
      <securityIndicator>724</securityIndicator>
      <issueNumber>00</issueNumber>
      <issueMonth>01</issueMonth>
      <issueYear>2007</issueYear>
    </creditcard>
    <paymentExtendedAttributes>
      <paymentExtendedAttribute>
        <name>new payment method</name>
        <value>1234</value>
      </paymentExtendedAttribute>
    </paymentExtendedAttributes>
  </payment>
  <taxInfo>
    <taxExempt>true</taxExempt>
    <buyerVatNumber>1341234123</buyerVatNumber>
  </taxInfo>
  <test>
    <testOrder>true</testOrder>
    <sendEmail>true</sendEmail>
```

TABLE 1-continued

CreateCartRequest
Sample Code

```
    </test>
</createCartRequest>
```

In general, a schema is an abstract representation of an object's characteristics and relationship to other objects. An XML schema represents the interrelationship between the attributes and elements of an XML object (for example, a document or a portion of a document). To create a schema for a document, the structure of the document is analyzed, and each structural element is defined as it is encountered. For example, within a schema for a document describing a web site, a web site element, a web page element, and other elements that describe possible content divisions within any page on that site are defined. Elements may be defined within a set of tags. Table 2 is an exemplary schema for one embodiment of an HGOP request.

TABLE 2

Schema Components Table

| Elements | Types | Null OK? | Definition |
|---|---|---|---|
| externalReferenceID | string | false | The client generated unique identifier for this order. |
| siteID | string | false | The e-commerce siteID of the site the customer is buying from. |
| locale | string | false | The requisition's locale. In the form of language + "_" + region. |
| programID | string | false | The e-commerce programID used for tracking purposes. |
| user | User | false | Information about the user placing this order. |
| billToAddress | common:AddressInfo (Version 1) | false | Billing Address for the order. |
| shipToAddress | common:AddressInfo (Version 1) | false | Shipping Address for the order. If empty the billToAddress should be used. |
| lineItems | LineItems | false | Contains order line items. At least one line item should be included in this array. |
| offers | Offers | false | Use this xsd:element, if you want to define your order level incentives. If this xsd:element is skipped, the e-commerce system will determine the incentives if applicable for the order in consideration. |
| payment | Payment | false | Order payment information. |
| taxInfo | TaxInfo | false | Allows you to specify a taxExempt status and provide a buyer VAT Number. |
| test | Test | false | Allows you to place a test order and toggle options about it. |
| extendedAttributes | ExtendedAttributes | false | A place to pass client specific name/value pairs. |
| externalReferenceID | string | false | The client generated unique identifier for this user. |
| loginID | string | false | The e-commerce loginID for the customer who placed this order. |
| password | string | false | A password is required when setting authenticated to 'true'. An MD5 hash or equivalent is fine but the plaintext version is required if you actually want the customer to be able to log into the e-commerce site. |
| authenticated | boolean | false | Setting authenticated to 'true' asserts that the user has already been authenticated (on another system). Therefore, the e-commerce system will not ask the user to sign in again or to create a new account. In the case that the user does not exist on the e-commerce system site a password must also be supplied. Defaults to 'false'. |
| lineItem | LineItem | false | |
| offer | Offer | false | |
| customer | Customer | false | |
| creditcard | Creditcard | false | |
| paymentExtended-Attributes | PaymentExtended-Attributes | false | |
| taxExempt | boolean | false | flag in expectation that we can not charge tax and code this up later [true, false] |
| buyerVatNumber | string | false | A place to supply the buyer vat number. Otherwise, under EU law, the e-commerce system is required to apply VAT to all products which are delivered by email or electronic download to customers who are located in an EU country. In the form, (country code + " " + vat number). |

TABLE 2-continued

Schema Components Table

| Elements | Types | Null OK? | Definition |
|---|---|---|---|
| testOrder | boolean | false | Used to create a test order. Test orders do not get committed in production. Defaults to "false". [true, false] |
| sendEmail | boolean | false | Email will be sent out if this is set to true. Defaults to "true". By default, email will be sent out. [true, false] |
| quantity | int | false | The quantity of product on the line item. |
| product | Product | false | |
| priceOverrideInfo | PriceOverrideInfo | false | |
| lineItemExtendedAttributes | LineItemExtendedAttributes | false | Additional attributes for a line item as name/value pair. |
| offerID | string | false | The E-commerce id of the order-level discount. |
| couponCode | string | false | Provides another way of referring to an order-level discount. |
| first | string | false | Customer's first name. |
| middle | string | false | Customer's middle name. |
| last | string | false | Customer's last name. |
| type | string | false | Contains the type of credit card used in the transaction. For example, visa, mastercard, discover, american express, diners club, jcb, maestro card, switchcard. |
| number | string | false | Contains the plaintext credit card number that is used in the transaction. |
| expirationMonth | string | false | 2 digit month. [01, 02, 03, 04, 05, 06, 07, 08, 09, 10, 11, 12] |
| expirationYear | string | false | 4 digit year. |
| securityIndicator | string | false | CVV/CID code for visa, master, discover and americanExpress card. |
| issueNumber | string | false | 2 digit issue number of switch card. |
| issueMonth | string | false | 2 digit issue month for switch card. [01, 02, 03, 04, 05, 06, 07, 08, 09, 10, 11, 12] |
| issueYear | string | false | 4 digit issue year for switch card. |
| paymentExtended-Attribute | PaymentExtended-Attribute | false | |
| externalReferenceID | string | false | The client generated unique identifier for this product. |
| companyID | string | false | E-commerce's unique id for the company who owns this product. |
| productID | string | false | E-commerce's unique id for the product. |
| price | Price | false | |
| lineItemExtendedAttribute | LineItemExtendedAttribute | false | |
| name | string | false | |
| value | string | false | |
| type | string | false | unit = "The per unit cost for the products in this line item. This includes contract discounts (buyer side contract discounts which is rare), and excludes all other discounts. It should be the same as ListPrice if there are no contracts." [unit] |
| currencyCode | string | false | See the ISO 4217 maintenance agency (http://www.bsi-global.com/iso4217currency) for more information, including a table of currency codes. |
| amount | string | false | |
| name | string | false | |
| value | string | false | |
| extendedAttribute | ExtendedAttribute | false | |
| name | string | false | |
| value | string | false | |

Use Cases

Figure 2:
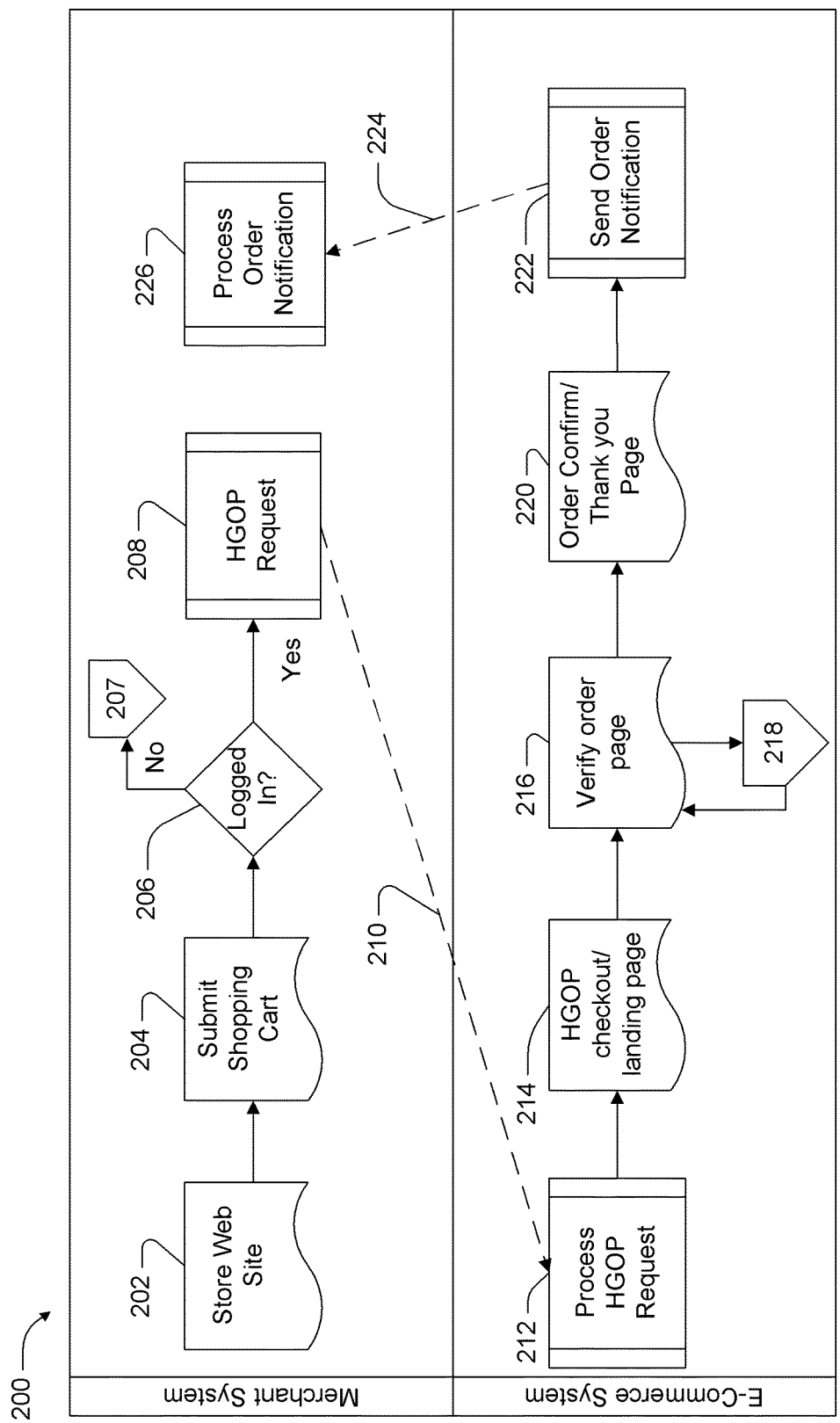
FIG. 2 illustrates the process flow of an HGOP system where customer accounts are in sync between the merchant system (storefront) and the e-commerce system.
Figure 3:
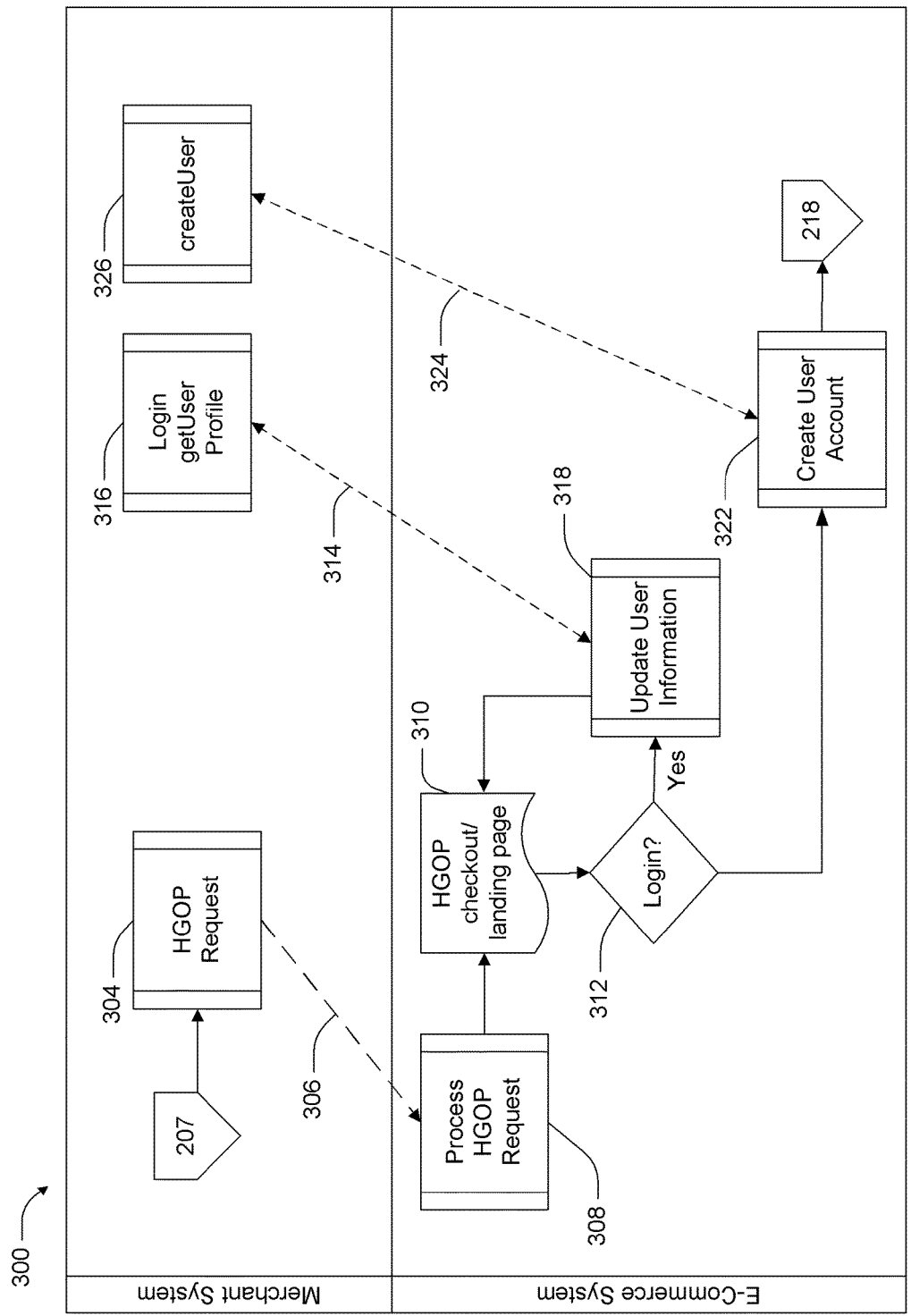
FIG. 3 illustrates the added process flow required when a user is new to the e-commerce system.

The flowcharts in FIGS. 2 and 3 describe a preferred embodiment HGOP process 200 and 300 and its associated processes. Referring to FIG. 2, the customer navigates to the merchant web site and adds items to the cart 202. When the customer is ready to commit to an order, s/he submits the cart for processing 204. If the customer has placed an order previously and has an account on both systems 206, the merchant's system generates the encrypted XML request 208 and transmits it to the e-commerce system 210 with the customer's unique identifier and username. If the customer is new and not authenticated on the merchant system, the customer is redirected 207 to a user account creation/edit process 300 shown in FIG. 3. The e-commerce system receives, decrypts and processes the request 212. SSO logs the user in to both systems. The e-commerce system presents the checkout/landing page 214 with the URL pointing to the local server, if more than one server is available. The e-commerce system allows the customer to verify his personal information (e.g. billing address) and verify the order 216. If the customer chooses to update the personal information, the system updates the customer's account accordingly 218. The user remains authenticated throughout the verification and update process 220. When the verification is complete, the customer confirms the order and receives a thank you page. The e-commerce system sends an order notification to the customer 222, and also sends a message 226 to the merchant system with the details of the order using a standard processed order XML message 224. The merchant system updates its records for the customer/order.

FIG. 3 illustrates the process 300 that occurs when a customer has not been authenticated on the merchant system. This might happen if a first time customer is making a purchase, or if the customer has an account on the merchant system, but not on the e-commerce system. SSO services may be used to login or create new users and ensure that both systems are synchronized with user accounts. Building on the shopping process 207 shown in FIG. 2, the HGOP request 306 generated by the merchant site 304 and received by the e-commerce site 308 in this case does not pass login information, the checkout/landing page 310 will expose login and new account fields. The customer may use login credentials 312 from the merchant system, or create an account on the e-commerce system 322. If the customer uses merchant-system credentials, the e-commerce system will send an XML API 314 to retrieve customer login information 316, and will update the system and display it on the checkout page. If the customer chooses to create a new account 322, one may be created on the e-commerce side and the new account information is passed from the e-commerce system 324 to the merchant system 326. The process continues with order verification 216 as described above.

FIGS. 4 through 7 illustrate some of the various scenarios in which the HGOP may be used. These different scenarios demonstrate the flexibility offered by the HGOP system for a product such as downloadable software; however, those skilled in the art will appreciate that the system may be used for any type of product and fulfillment method. In addition, any number of services may be provided by the e-commerce system, depending on the desired configuration of services or needs of the merchant (payment processing, fulfillment and distribution, digital rights management, etc).

Figure 4:
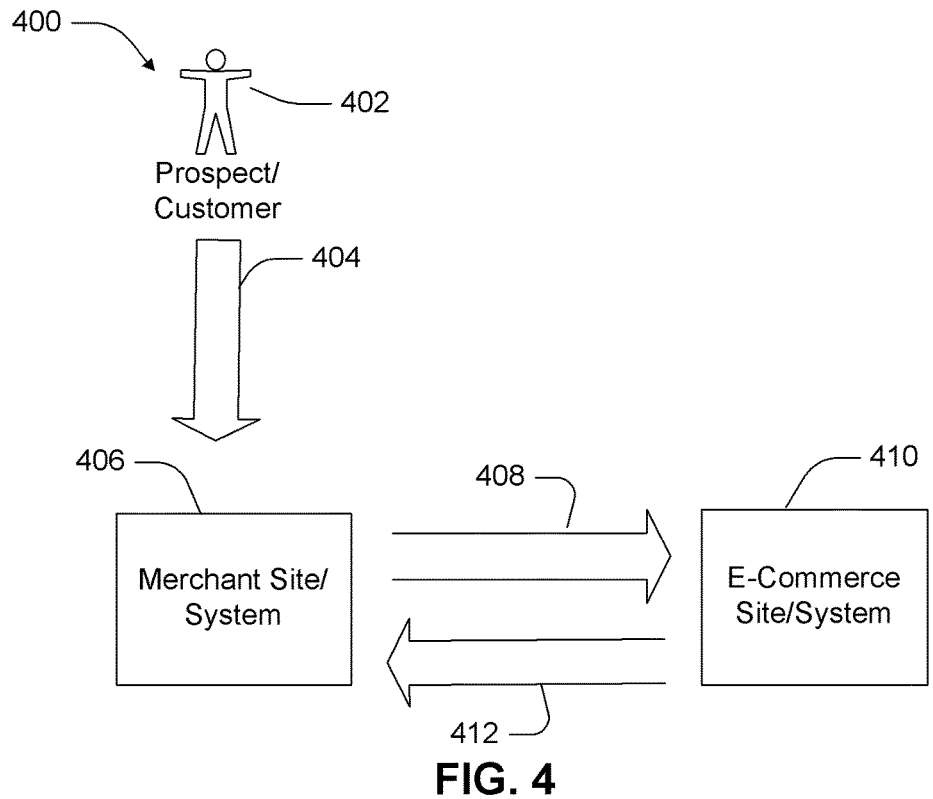
FIG. 4 illustrates the use of an HGOP system on a "try before you buy" download transaction.

FIG. 4 illustrates an example of a "try before you buy" conversion process 400. In this example, a prospect or customer 402, located in any part of the world, decides to purchase a digital product that it had previously downloaded and logs into the merchant web site. The customer in this scenario has an account on both systems from the previous "try" transaction. The merchant presents all product information to the customer 404, 406. The customer is redirected to the e-commerce cart 408 with a merchant identifier so that the order may correctly be placed against the merchant's store. As noted earlier, an HGOP system managed by an e-commerce provider with multiple servers located throughout the world can pull the location information from the posting URL and use it to direct the customer to the nearest server to provide load balancing and the ability to offer benefits related to the geographic location of the customer, such as payment options. A customer may be identified on the e-commerce system by the merchant-assigned memberID (external reference id) 408. If the customer is found on the e-commerce system, customer account information is preloaded into the form. The e-commerce system can collect any additional customer purchasing information, process the payment, and send the software license entitlement back to the customer 410. The merchant may then fulfill the purchased license 404. In this scenario, the memberID is passed back from the e-commerce system so that the entitlement is included in the merchant's existing catalog 412. Alternatively, the e-commerce system may fulfill the product.

Figure 5:
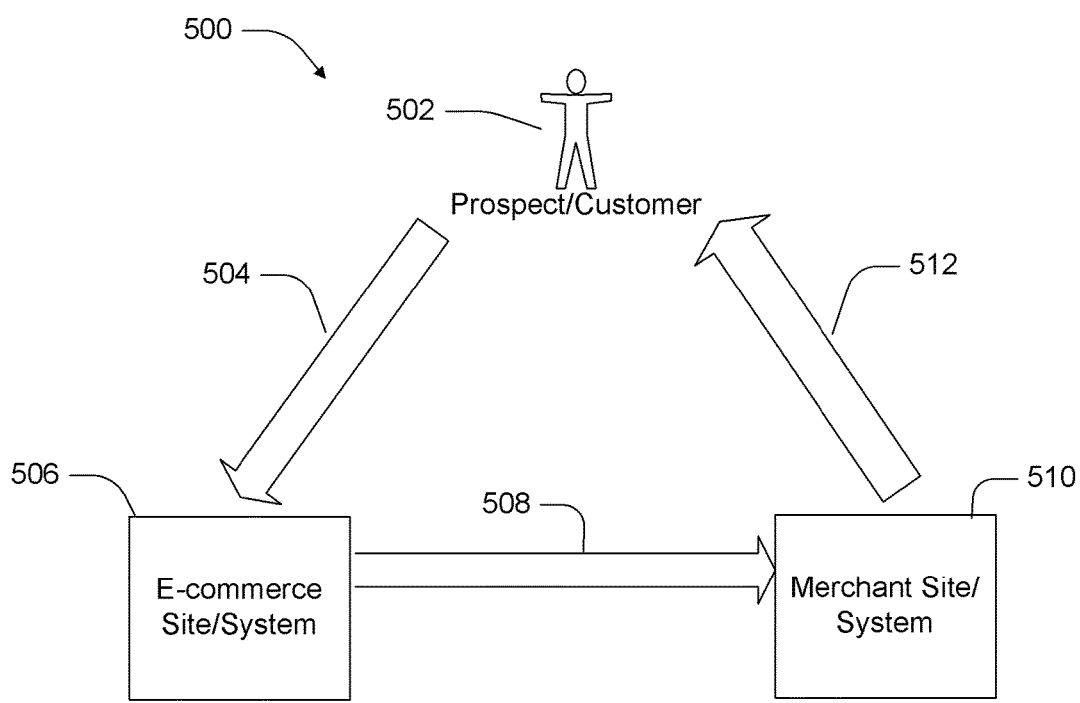
FIG. 5 illustrates the use of an HGOP system on a new user order in response to a marketing campaign.
Figure 6:
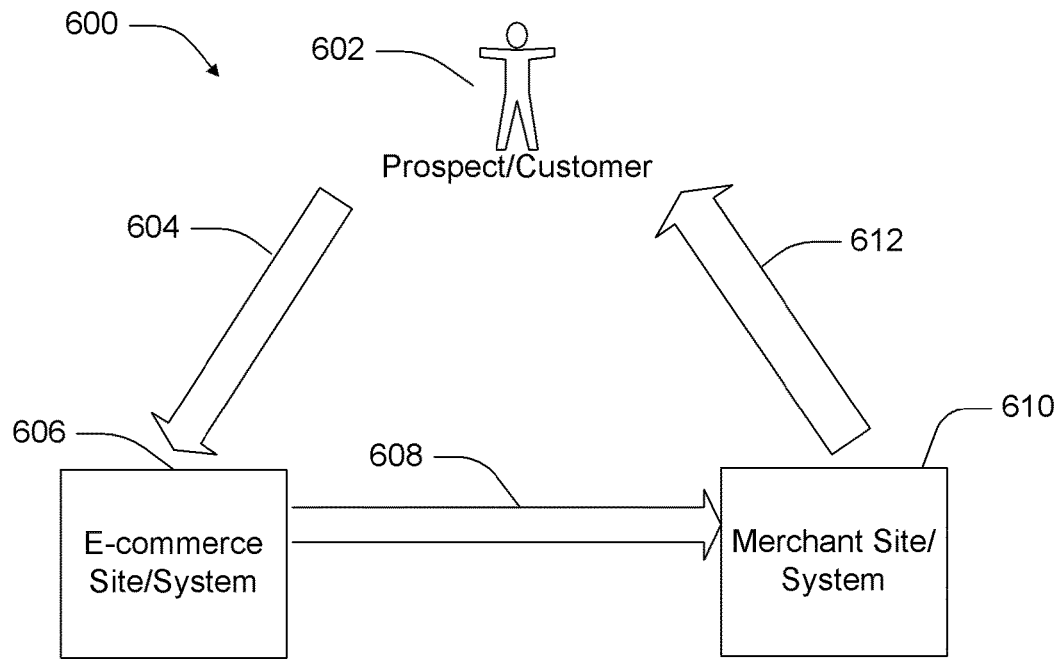
FIG. 6 illustrates the use of an HGOP system on an order for an existing customer.
Figure 7:
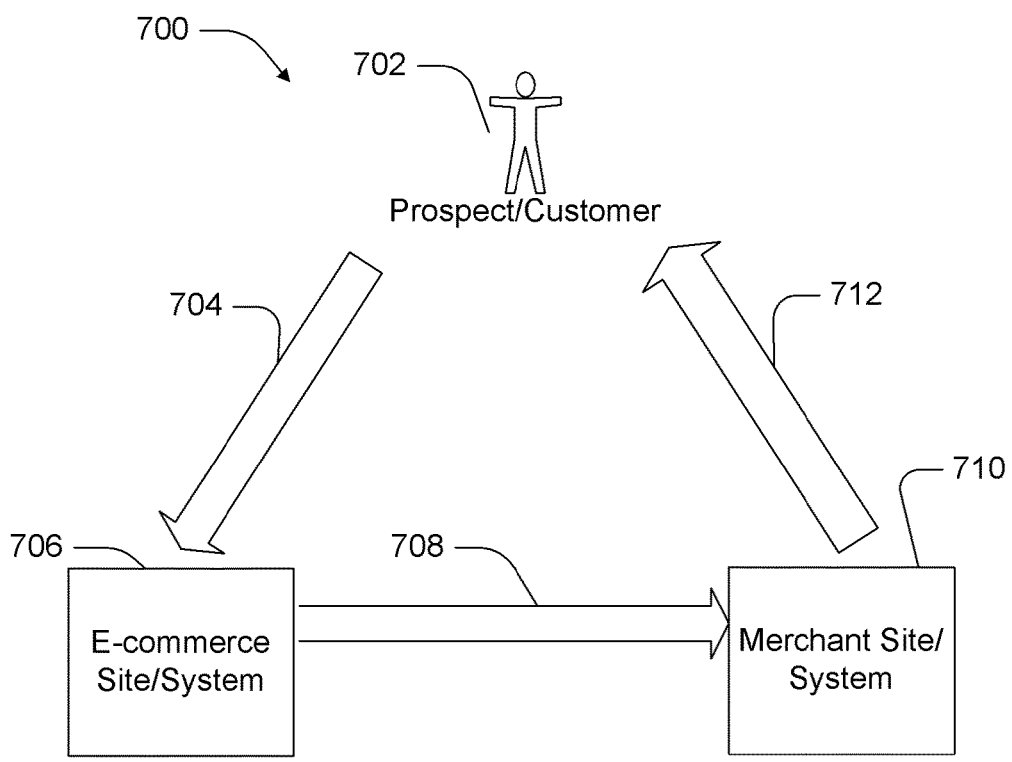
FIG. 7 illustrates the user of an HGOP system on an order for a returning customer who has no account on the e-commerce site.

FIGS. 5, 6 and 7 (500, 600, 700) illustrate the same process for alternative customers and scenarios. Each uses the HGOP interface for a slightly different purpose. In FIG. 5, a new customer 502 decides to make a purchase based on a marketing campaign for which an e-mail address was required. S/he loads the cart with the desired items 504, and submits the order. The e-commerce system presents the HGOP page with product details and the form to collect customer information. Once the order data is completed, the e-commerce system creates an account 506 and uses a standard API to notify the partner that order is complete 508, and the partner creates the customer account 510 and sends an e-mail to the customer with information on downloading the product 512.

In FIG. 6, the process 600 is essentially the same; the customer has an account the e-commerce system from a previous transaction. The customer 602 fills its cart and submits the order. The prepopulated form is presented to the customer, the customer confirms and the verify order page is displayed 604 to complete the customer's experience. The system then uses a standard order notification API to notify the merchant of the order details 606, and the merchant processes the account on its side 608, 610, 612 as per its normal procedures.

In FIG. 7, again, the basic process 700 is the same. The customer places items in the cart 704, and the merchant requests the HGOP page, which is displayed with product details and a blank form for collecting customer information 706. In this case, the e-commerce system might be creating an account for a previously existing customer of the merchant site (in other words, the customer has a merchant account, but not an e-commerce account). The HGOP displays the verify order and thank you pages to the customer to complete the customer experience. The e-commerce system returns the order details to the merchant using a standard order confirmation API 708. The merchant may choose to merge the accounts on its system 710 or continue to match based on a field such as e-mail address. Subsequently, the merchant sends an e-mail to the customer with information on downloading the product 712

The type of Web services described are preferably implemented in a data processing system configured as a server in accordance with an embodiment of the contemplated invention. The data processing system may be a symmetric multiprocessor (SMP) system including a plurality of processors and connected to system bus. Alternatively, a single processor system may be employed. Also connected to system bus is memory controller/cache, which provides an interface to local memory. An I/O bus bridge is connected to system bus and provides an interface to the I/O bus. Memory controller/cache and the I/O bus bridge also may be integrated together. A peripheral component interconnect (PCI) bus bridge connected to the I/O bus provides an interface to a PCI local bus. Communications links to clients may be provided through a network adapter connected to the PCI local bus. A memory-mapped graphics adapter and hard disk may also be connected to the I/O bus. Those of ordinary skill in the art will appreciate that the hardware described above may vary. For example, other peripheral devices, such as optical disk drives and the like, also may be used in addition to or in place of the hardware depicted. The example described is not meant to imply architectural limitations with respect to an embodiment of the present invention.

Instructions for the operating system, the object-oriented programming system, and applications or programs are located on storage devices, such as the hard disk drive, and may be loaded into memory for execution by a processor. The processes of an embodiment of the present invention are performed by a processor using computer implemented instructions, which may be located in a memory or in one or more peripheral devices.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the Web interface such that different dialog boxes are presented to a customer that are organized or designed differently while maintaining substantially the same functionality without departing from the scope and spirit of the contemplated invention.

What is claimed is:

1. An electronic purchase order processing system comprising:
   an e-commerce server comprising:
      a processor;
      a memory; and
      a database storing first customer account information; and
   a merchant server comprising:
      a processor;
      a memory;
      data storage storing second customer account information,
   wherein the merchant server is programmed to perform the operations of:
      receiving a posting endpoint URL from the e-commerce server;
      hosting a product catalog and virtual shopping cart on a merchant sever website;
      presenting the product catalog to a customer via a merchant web page shopping cart interface;
      receiving a purchase request from the customer;
      generating an XML request from the virtual shopping cart, wherein the XML request includes order ID, merchant server's site ID, tracking ID, customer account; customer password; authentication indicator; billing address; shipping address; line items from the product catalog received from the customer; and payment information, wherein the authentication indicator indicates whether the customer has been authenticated;
      determining that the customer has placed an order previously and has an account on the e-commerce server and the merchant server;
      encrypting the XML request and transmitting the encrypted XML request to the e-commerce server via posting endpoint URL based on the determination; and
      redirecting the customer to the e-commerce server via the posting endpoint URL; and
   wherein the e-commerce server is programmed to perform the operation of:
      receiving the encrypted XML request from the merchant server;
      decrypting the encrypted XML request;
      using the information extracted from the XML request in performing a single sign on process by utilizing the authentication indicator;
      synchronizing the first customer account information with information extracted from the XML request in response to performing the single sign on process;
      presenting a checkout page to the customer;
      populating an order verification form with retrieved information from the first customer account information from the database prior to presenting the order verification form to the customer and presenting the populated order verification form to the customer;
      receiving a verification from the customer; and
      in response to receiving the verification, transmitting an order confirmation to the merchant server.

2. The electronic purchase order processing system of claim 1, wherein the e-commerce system server is further programmed to perform an operation of providing order history for the customer based on a match between the customer information with the account in the e-commerce system.

3. The electronic purchase order processing system of claim 1, wherein the merchant web commerce system server sends a previously provided encryption key and the contents of a customer's shopping cart to the e-commerce system server over the pre-existing communication network, the encryption key having been previously provided to the merchant web commerce system by the e-commerce system.

4. The electronic purchase order processing system of claim 1, wherein the e-commerce system server further programmed to perform an operation of providing a back-end order processing function, the back-end order processing function being selected from a group consisting of: payment processing, account management, order fulfillment, and distribution logistics.

5. The electronic purchase order processing system of claim 1, wherein the e-commerce system server further programmed to perform the back-end order processing of account creation using information of the customer.

6. The electronic purchase order processing system of claim 1, wherein the merchant web page shopping cart interface allows the customer to make a product selection and displays information to the customer pertaining to the selected product.

* * * * *